UNITED STATES PATENT OFFICE.

HANS KUZEL, OF BADEN, NEAR VIENNA, AUSTRIA-HUNGARY.

PROCESS OF PEPTISATING COLLOIDAL ELEMENTS.

No. 899,875.      Specification of Letters Patent.      Patented Sept. 29, 1908.

Application filed March 26, 1907. Serial No. 364,734.

*To all whom it may concern:*

Be it known that I, HANS KUZEL, a subject of the Emperor of Germany, and a resident of Baden, near Vienna, in the Empire of Austria-Hungary, have invented certain new and useful Improvements in the Processes of Peptisating Colloidal Elements, of which the following is a full, clear, and exact description, such as will enable others skilled in the art to which it appertains to make and use the same.

It is well known that colloidal or pseudo-solutions of all substances can be coagulated for instance by the addition thereto of an electrolyte, the coagulum so obtained being called according to Graham's nomenclature a "gel", as contradistinguished from the solid "sol", which in many cases may be obtained from the colloidal or pseudo solutions by cautious evaporation. The essential difference between the "gel" and the solid "sol" is that the latter may be directly dissolved in an imbibition liquid while the "gel" is not directly soluble in an imbibition liquid. Hence a colloidal solution or a pseudo-solution or a colloidal suspension may be considered as a solution of a sol.

In case water is the imbibition liquid in which the "sol" is soluble, the "sol" is called a hydrosol and the gel obtained from a solution of this hydrosol is called a hydrogel. In case alcohol is the imbibition liquid, the sol and gel are called "alcosol" and "alcogel" respectively, and so on in case of other imbibition liquids. Now there are different classes of such gels. Those of one class can be made soluble in imbibition liquid or reconverted into sols by subjecting them to a special treatment with certain reagents; this treatment is called "peptisation" and the gels of this class are called by Zsigmondy "imperfectly irreversible sols". To this class belong the colloids of many compounds, such as oxids, or sulfids of metals. Heretofore it was believed that the gels of pure metals after having been formed by coagulating the corresponding sols, say by means of electrolytes could not be rendered soluble in imbibition liquids or reconverted into sols by such special treatment with certain reagents or in other words could not be peptisated. Therefore the gels of pure metals were called "perfectly irreversible sols". To obtain from such non-peptisable gels colloidal solutions, a metal salt must first be formed from them, and from this the metal must be again reduced, or they must be atomized by means of the voltaic arc, according to Bredig's or Svedberg's methods (compare Zsigmondy *Erkenntnis der Colloide* chapter "Einige Worte über Gelbildung", page 176 *et seq.*)

I have found that the refractory elements: chromium, molybdenum, uranium, tungsten, vanadium, tantalum, niobium, titanium, thorium, zirconium, boron and silicon constitute exceptions to this rule, as their gels are very easily peptisated. According to my invention I peptisate the gels of the refractory elements above named by treating them with small quantities of solutions of alkaline reaction, such as ammonia, or ammonium bases or fixed alkalies (caustic soda or potash) or their carbonates. If for instance to the gel of tungsten obtained say by precipitating the colloidal solution of tungsten by a just sufficient quantity of an electrolyte or by electric atomizing of metallic tungsten in the presence of an electrolyte, ammonia or an ammonium base, for instance, methylamin, is added, until after repeated shaking, it just clearly smells thereof, or red litmus paper is blued, then after a short time on the addition of a sufficient quantity of pure distilled water, the entire gel passes into a colloidal or pseudo solution, showing all the characteristics of a colloidal solution. Particularly on being filtered it goes through the filter without leaving on the same a notable residue, the filtered liquid being dark colored and inklike in appearance, but perfectly transparent in thin layers; on irradiation by a positive lens, the liquid shows the Tyndall effect, that is to say, a cone of light is seen in the liquid (similar to that seen under the same conditions in fluorescent solutions), the light emitted by the same being polarized. The small quantity of residue remaining on the filtering paper is retained by the same perhaps by absorption. The sols thus formed by peptisating the gels are transformed by a longer or continued action of ammonia, into gels again by pectinizing.

By small quantities of fixed alkalies, for instance, caustic alkalies or alkali carbonates, the same phenomena are produced; their concentration must however be much lower than that of ammonia. Thus for instance, when caustic soda is used, a concentration of 0.05% is sufficient. Such peptisated colloidal metals have in a concentrated form a high agglomerating power for dry powders of any kind, for instance, metal powders and are designed to be used, in connection with such dry metal powders by mixing them with the latter, whereby a plastic mass is obtained, which is then brought to the desired shape, for instance, into that of thin threads. The bodies thus obtained are then dried and finally heated to a suitable temperature not exceeding the melting temperature of the elements used. By such heating the colloid is reconverted into the ordinary metallic state and forms what is usually called a solid solution with the constituent added in a pulverulent state.

If powdered lead is added to colloidal metals peptisated as above described and the plastic mass thus obtained is molded, dried and heated as above indicated, projectiles of high specific gravity and great toughness are obtained.

I claim as my invention:

A process for peptisating coagulated colloids of refractory elements free from carbon, consisting in treating such colloids with solutions of alkaline reaction and stopping such treatment before pectinizing begins, substantially as described.

In testimony whereof I have signed my name to this specification, in the presence of two subscribing witnesses.

HANS KUZEL.

Witnesses:
T. GEORGE HARDY,
ALVESTO S. HOGUE.